US011231860B2

(12) United States Patent
Danilov et al.

(10) Patent No.: US 11,231,860 B2
(45) Date of Patent: *Jan. 25, 2022

(54) DOUBLY MAPPED REDUNDANT ARRAY OF INDEPENDENT NODES FOR DATA STORAGE WITH HIGH PERFORMANCE

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/745,855

(22) Filed: Jan. 17, 2020

(65) Prior Publication Data

US 2021/0223969 A1     Jul. 22, 2021

(51) Int. Cl.
*G06F 3/06*     (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ........ G06F 3/06; G06F 3/0631; G06F 3/0604; G06F 3/0689; G11B 2220/415
USPC ....................................................... 711/154
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,240,527 B1 | 5/2001 | Schneider et al. |
| 6,502,243 B1 | 12/2002 | Thomas |
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |

(Continued)

OTHER PUBLICATIONS

Non-Final Office Action received for U.S. Appl. No. 16/177,285 dated Jul. 22, 2020, 31 pages.

(Continued)

*Primary Examiner* — Michael Krofcheck
*Assistant Examiner* — John Francis Wojton
(74) *Attorney, Agent, or Firm* — Amin, Turocy & Watson, LLP

(57) ABSTRACT

The described technology is generally directed towards mapping doubly mapped storage clusters to resources of a real storage cluster in a way that provides high performance. In one aspect, the doubly mapped storage clusters are divided into logical columns, with each logical column corresponding to a doubly mapped node, and having a column height corresponding to a number of storage resources (e.g., disks multiplied by disk extents) managed by that doubly mapped node. The columns are logically positioned within a logical profile having dimensions of the real storage cluster. For example, the logical columns can be selected based on column height, and placed in the logical profile based on free disk extents of the nodes, greatest number of free disk extents first. Once logically positioned, the logical columns in the logical rectangle establish the mapping (e.g., embodied in a mapping table) that results in high performance.

20 Claims, 14 Drawing Sheets

(56) References Cited

U.S. PATENT DOCUMENTS

| | | |
|---|---|---|
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,644,408 B2 | 5/2020 | Sakai et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,797,863 B2 | 10/2020 | Chen et al. |
| 10,846,003 B2 * | 11/2020 | Danilov ............... G06F 3/0631 |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrier et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |

(56) References Cited

U.S. PATENT DOCUMENTS

| | | |
|---|---|---|
| 2015/0378542 A1* | 12/2015 | Saito .................. G06F 3/0629 715/736 |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Vang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Non-Final Office Action received for U.S. Appl. No. 15/651,504 dated Mar. 21, 2019, 10 pages.

Non-Final Office Action received for U.S. Appl. No. 15/662,273 dated Nov. 16, 2018, 19 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels—RAID 6", URL: https://en.wikipedia.org/wiki/Standard_RAID_levels#RAID_6", Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non-Final Office Action received for U.S. Appl. No. 16/177,278 dated Dec. 2, 2019, 55 pages.

(56) References Cited

OTHER PUBLICATIONS

Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf,Jun. 2015, 21 pages.
Mohan et al., "Geo-aware erasure coding for high-performance erasure-coded storage clusters", Springer Link, URL https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE Infocom, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.

(56) References Cited

OTHER PUBLICATIONS

Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Office Action dated Nov. 24, 2021 for U.S. Appl. No. 16/526,182, 83 pages.
Notice of Allowance dated Nov. 22, 2021 for U.S. Appl. No. 16/888,144, 71 pages.

* cited by examiner

DOUBLY MAPPED REDUNDANT ARRAY OF INDEPENDENT NODES FOR DATA STORAGE WITH HIGH PERFORMANCE

TECHNICAL FIELD

The subject application generally relates to data storage, more particularly, to mapping storage device components to facilitate performance, and related embodiments.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. A mapped Redundant Array of Independent Nodes (RAIN), also referred to a mapped cluster, is a virtualization technology based on a relationship of logically mapped nodes to an underlying real storage device (e.g., disk) pool, comprising a real cluster (RAIN).

Because disks can be excessively large for some types of data storage, a further data storage technique is to provide a doubly mapped RAIN (or a doubly mapped cluster), in which disks are divided into extents. For example, given a cluster of N nodes, in which each node manages M disks and in which each disk is divided into L extents, the N*M*L extents form an extent pool. A doubly mapped RAIN can be built using extents from the extent pool. For example, a doubly mapped cluster may be mapped such that with N' mapped nodes, each mapped node may manage M' mapped disks, and each mapped disk may have L' extents allocated from the extent pool. A mapping table that can be accessed by software/firmware maintains information about the relationship between the mapped nodes and the disks in the disk pool/real cluster.

As with any virtualization technology, the use of doubly mapped clusters penalizes performance. There are many possible ways to map mapped clusters to real resources; and the mapping that is chosen determines the extent to which performance is affected.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
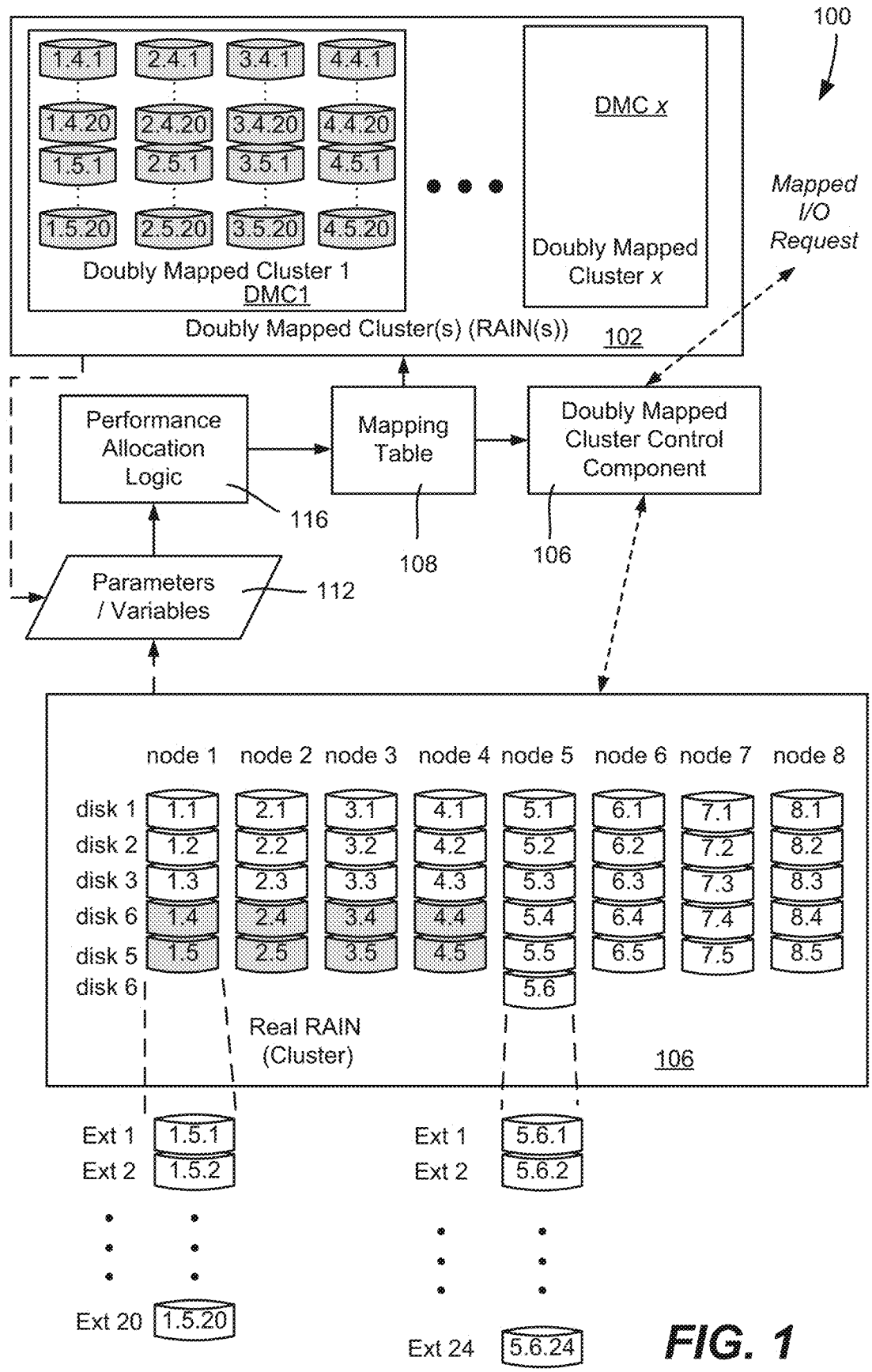
FIG. 1 is an example block diagram representation of a doubly mapped cluster (RAIN) in which nodes are mapped to real nodes, storage devices and their extents for performance, in accordance with various aspects and implementations of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As will be understood, the implementation(s) described herein are non-limiting examples, and variations to the technology can be implemented. For instance, many of the examples herein are based on dividing a doubly mapped Redundant Array of Independent Nodes (RAIN, used synonymously herein with "doubly mapped cluster" and/or "doubly mapped nodes") into single-width columns of mapped nodes, and selecting a node with the greatest number of free extents to position the columns to align with nodes, disks and extents of a real RAIN (used synonymously herein with "real cluster"). However, the technology described herein can provide benefits with different width columns, can use different positioning patterns, and so forth. Moreover, the term "disk" or "disks" is used in many of the examples described herein, however it is understood that any data storage resource/storage device that can be divided into smaller components (e.g., extents) may be used instead of or in addition to disks/disk extents. As such, any of the embodiments, aspects, concepts, structures, functionalities, implementations and/or examples described herein are non-limiting, and the technology may be used in various ways that provide benefits and advantages in virtualization and data storage technologies in general.

As set forth above, data storage techniques can conventionally store data in one or more arrays of data storage devices. Data can conventionally be stored in a group of nodes formatted for a given cluster, for example, with the disks of nodes being considered part of a group. As a result, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via large real groups, but still providing smaller logical groups that can be used more efficiently for storing smaller amounts of data therein. The concept of doubly mapped clusters provides such smaller logical groups.

FIG. 1 is an illustration of a system 100 that can facilitate storage of data in one or more doubly mapped clusters 102, in accordance with aspects of the subject disclosure. The system 100 can comprise a real RAIN/cluster 104 comprising one or more hardware nodes that each comprise one or more storage resources/devices, e.g., hard disks, optical storage, solid state storage, and so on, which are further divided into components referred to as extents. For example, the shaded storage devices and extents (identified by node no. disk no. extent no. as 1.4.1-1.5.20, 2.4.1-2.5.20, 3.4.1-3.5.20 and 4.4.1-4.5.20) of the real cluster 104 are shown as having been mapped to a doubly mapped cluster DMC1.

Once mapped as described herein, the real RAIN/cluster 104 can receive data I/O requests (data writes/output data reads) corresponding to logical storage locations in a doubly mapped cluster DMC1-DMCx, e.g., data in real storage is accessed by I/O referencing storage in the doubly mapped cluster 102. The data as stored in extents of the one or more storage devices of the real cluster 104 can be accessed by a doubly mapped cluster control component 106 according to a logical mapping of the storage space, e.g., maintained in a mapping table 108, as generally represented in FIG. 1 by the slanted, dashed lines.

In an aspect, any of the doubly mapped cluster(s) 102 can be a logical allocation of storage space (including extents) of a real cluster 104. In an embodiment, a portion of a real disk can be comprised in a real node that can be comprised in a real cluster and, furthermore, a portion of the real disk can correspond to a portion of a mapped disk and mapped disk extent, a mapped disk can comprise one or more portions of one or more real disks, a mapped disk extent can comprise one or more portions of one or more real disk extents, a mapped node can comprise one or more portions of one or more real nodes, a mapped cluster can comprise one or more portions of one or more real clusters, etc.

Described herein is a technology for allocating the storage resources of a real cluster to doubly mapped clusters in a way that provides for high performance (relative, for example, to random or otherwise unplanned allocation). In general, the closer the resource mapping for a mapped cluster (RAIN) is to a real RAIN, the higher the performance. To this end, a doubly mapped cluster approaches (or has) a highest performance when the resource mapping for the doubly mapped cluster is as close as possible to the one a real cluster normally has. Namely, one mapped node manages the mapped disks made of storage extents of real disks from one real node and the storage services of the mapped node run on the real node that donated disk extents for the mapped disks of the mapped node.

To this end, as shown in FIG. 1, based on various parameters 112 as described herein, performance allocation logic 114 generates the mappings for the mapping table in a way that is performant. As will be understood, the performance allocation logic 114 operates such that one mapped node manages a set of disks and disk extents from one real node, and the storage services of the mapped node can run on the real node to which the set of disks is connected.

Figure 2:
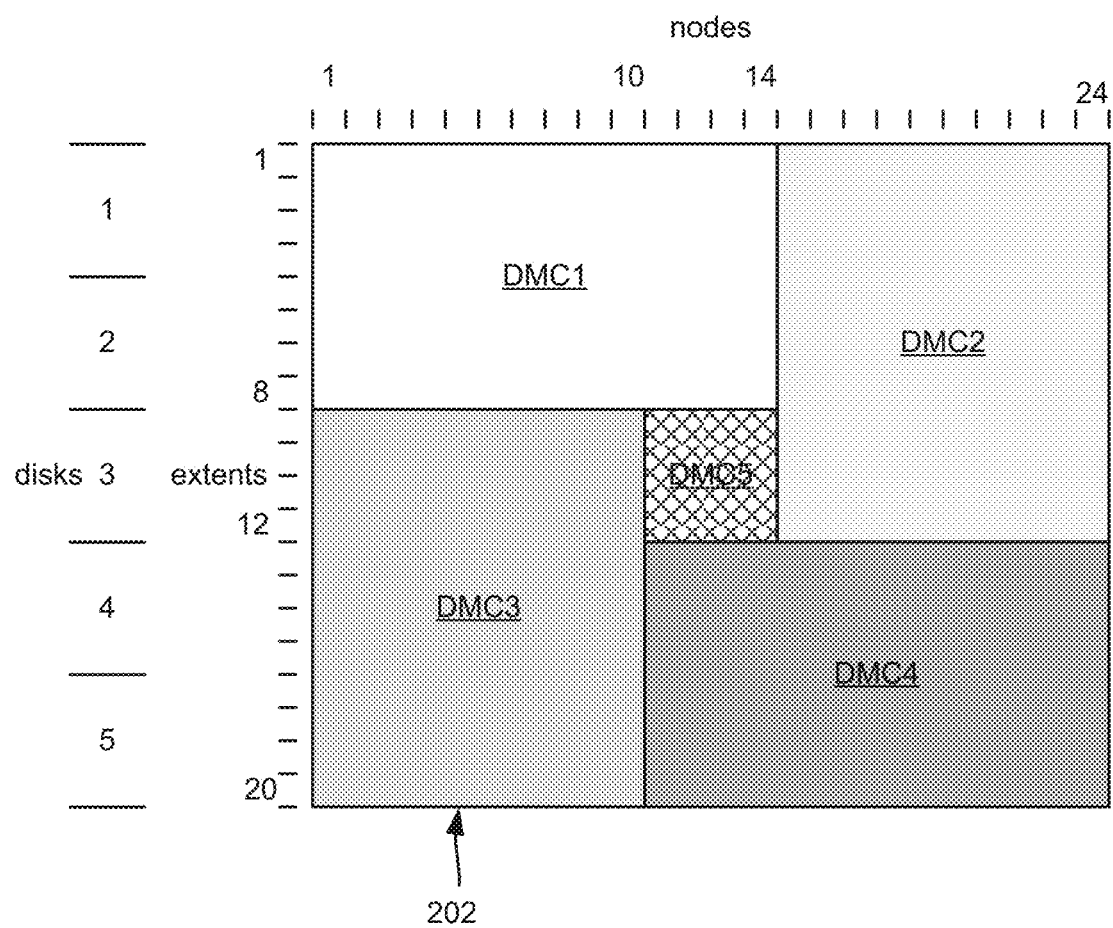
FIG. 2 is an example representation of how a doubly mapped cluster (RAIN) can be mapped to real RAIN resources, in accordance with various aspects and implementations of the subject disclosure.

FIG. 2 illustrates a system with five high-performance doubly mapped clusters (DMC1-DMC5). In FIG. 2, there is a real cluster of 24 nodes, where each node manages 5 disks, and each disk is divided into 4 extents. Thus, the size of the real cluster can be indicated as 24×5×4. In the example of FIG. 2, the real cluster runs the five doubly mapped clusters DMC1-DMC5 of various sizes, namely 14×2×4 (DMC1), 10×3×4 (DMC2), 10×3×4 (DMC3), 14×2×4 (DMC4), and 4×1×4 (DMC5).

Each mapped node of the doubly mapped clusters manages mapped disks made of extents of real disks connected to one real node. For instance, the first node of DMC1 manages two mapped disks, which are built using the extents of disks of the first real node. Accordingly, storage services of each mapped node run on a real node, which has the disk extents allocated for the mapped disks of the mapped node. In the example of FIG. 2, the first real node runs the storage services of the first mapped nodes of DMC1 and DMC3.

In general, various aspects of the resource allocation for doubly mapped clusters are based on disk extents having a moderate size. For example, contemporary storage systems use relatively small 4 GB extents (also referred to as slices). Further, in general the throughput of disk controllers is irrelevant to the technology described herein. While some storage systems use information about throughput of disk controllers to limit a number of active disks at any particular point of time, with the technology described herein disk controller throughput can be ignored, as one real node is expected to accommodate mapped nodes of two or more independent doubly mapped clusters. Therefore, there need not be control over a number of active disks at a given point of time at the system level.

These above aspects provide for generally independent actual mapping between real and mapped disks within one real node. Because extents are small enough, alignment is not a problem. Because throughput of a disk controller is not a concern, mapped disks can be built using extents of an arbitrary (small or great) number of real disks. Therefore, if a real node has enough free extents to accommodate another mapped node with the real node's mapped disks, then there is likely a valid layout for the mapped disks within the real node.

A general goal is thus to allocate resources of a real cluster to run a plurality of doubly mapped clusters. Each doubly mapped cluster can be described as N'×V', where V' is M'×L' (where N' represents doubly mapped nodes, M' represents disks, and L' represents). An aspect is to find real nodes with enough free disk extents for mapped nodes of a doubly mapped cluster. Not that with respect to looking for an actual layout of mapped disks within their real nodes, this can be implemented as an additional post-check.

Turning to aspects of how to allocate disk extents of a real cluster in a way that assures the high-performance configuration of doubly mapped clusters and high capacity utilization of the real cluster, as can be readily appreciated, the problem is to pack the doubly mapped nodes into the real RAIN's logical profile space in a way that meets the desired performance-related characteristics (each mapped node of the mapped RAINs manages a set of disks from one real node) as described herein.

More specifically, it is a problem of packing different rectangles in an enclosing area, which can be where the axis X represents nodes and the axis Y represents disk extents. Because this problem is NP-hard, heuristics as described herein solve the problem.

Note that in contrast to the example of FIG. 2, it is noted that a representation of a real cluster is not always a rectangle. Thus, described herein is a technology that supports heterogeneous configurations, in which real nodes can contain different numbers of disks of different sizes.

Figure 3:
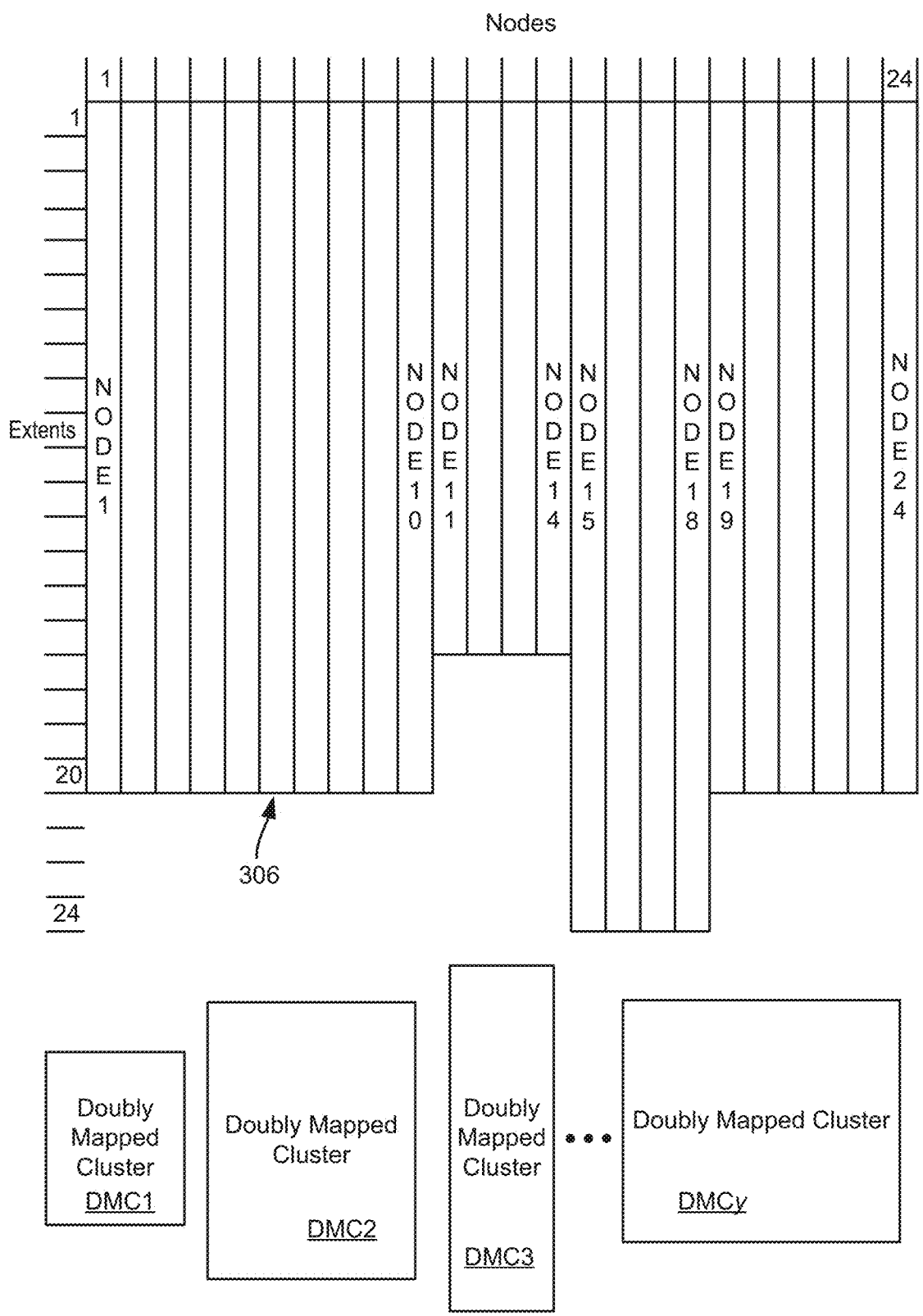
FIG. 3 is an example conceptual diagram representing mapping doubly mapped clusters to real storage device extents based on a logical profile that represents nodes and storage device extents of a real cluster, in accordance with various aspects and implementations of the subject disclosure.

FIG. 3 depicts a profile 306 of one possible heterogeneous real cluster configuration. As is represented in FIG. 3, a set of doubly mapped clusters (shown in FIG. 3 as DMC1-DMCy) can have mapped clusters of any desired number and any desired dimensions, (provided they fit into the real RAIN's profile 306 in this example); the number of mapped RAINs and their respective dimensions, along with the real RAIN dimensions, comprise the parameters/variables 112 (FIG. 1) that the performance allocation logic deals with as described herein.

Figure 4:
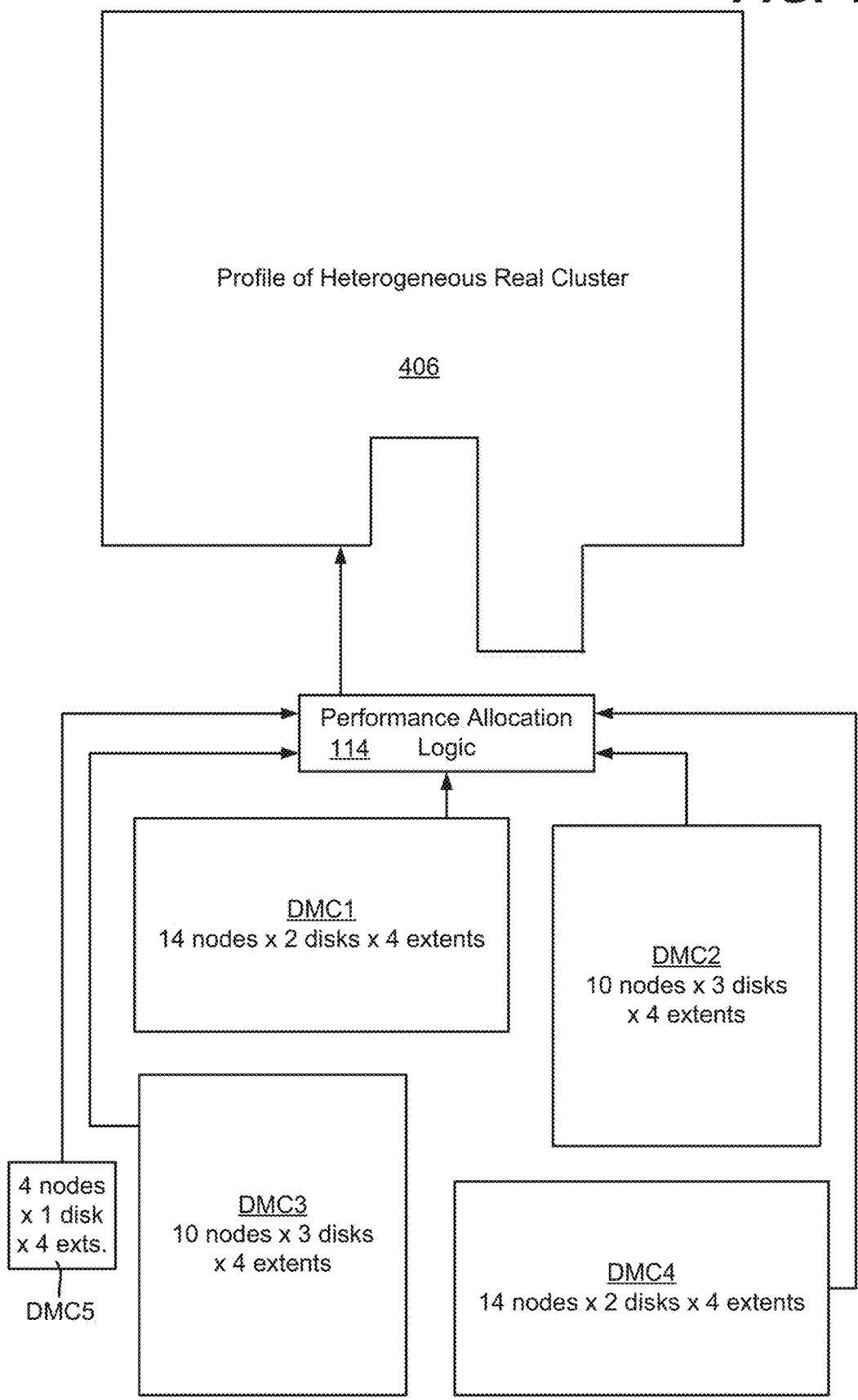
FIG. 4 is an example block diagram representation of a number of doubly mapped clusters of various sizes for mapping to real storage device extents based on a logical profile that represents nodes and storage device extents of a real cluster, in accordance with various aspects and implementations of the subject disclosure.

By way of a more particular example, in FIGS. 3 and 4, there is shown a logical profile 306 of a real RAIN that represents the dimensions of a real RAIN of twenty-four nodes (horizontal), in which some nodes manage twenty disk extents (Node 1-Node 10 and Node 19 through Node 24, represented vertically), some nodes manage sixteen disk extents (Node 11 through Node 14), and some nodes manage twenty-four disk extents (Node 15 through Node 18). Consider that the doubly mapped clusters of FIG. 2 (DMC1-DMC5, of sizes 14×2×4 (DMC1), 10×3×4 (DMC2), 10×3×4 (DMC3), 14×2×4 (DMC4), and 4×1×4 (DMC5)) are to be mapped to the real RAIN based on the profile 306.

As described herein, it is desired that each mapped node of the mapped clusters manages a set of disk extents from one real node. For instance, the first node of DMC2 can be mapped so as to manage the first twelve disk extents of the first real node. Accordingly, storage services of each mapped node run on a real node, which has the disks allocated for the mapped node. For instance, the first real node can run the storage services of the first mapped nodes of DMC2 and DMC4.

To meet these desired characteristics and thereby provide high performance, the technology described herein, as implemented in part in the performance allocation logic 114, divides the mapped clusters into logical columns of nodes (which can alternatively be referred to as stripes). In one or more implementations, the dividing operation results in a single column/mapped node widths of one; packing with the column width of one helps to avoid unused space in different parts of the rectangle of the real RAIN; (although it can be appreciated that a wider column can be used, e.g., since the widths of the mapped RAINs have a least common denominator of two, the width of the columns can be two, etc.).

Figure 5:
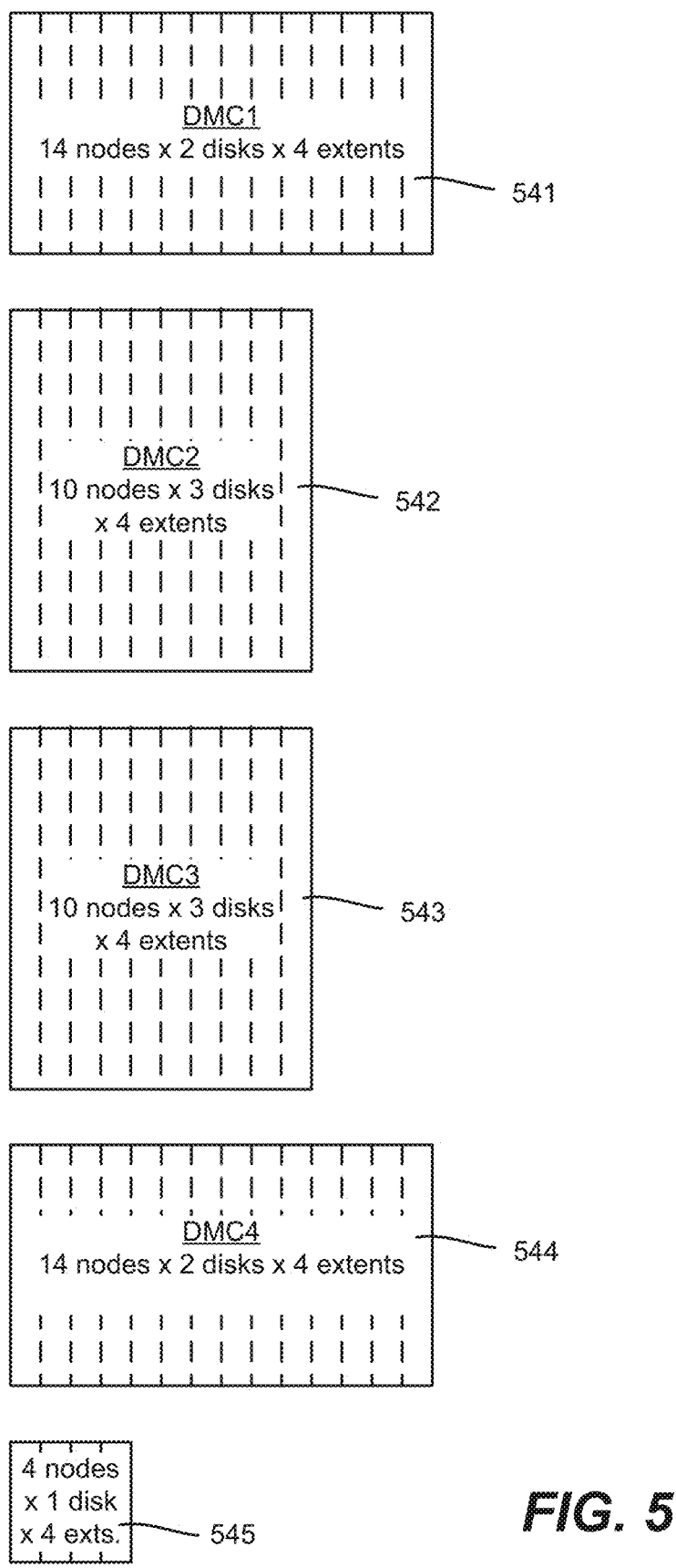
FIG. 5 is an example block diagram representation of doubly mapped clusters being divided into columns for performant mapping to real nodes and corresponding storage device extents, in accordance with various aspects and implementations of the subject disclosure.
Figure 6:
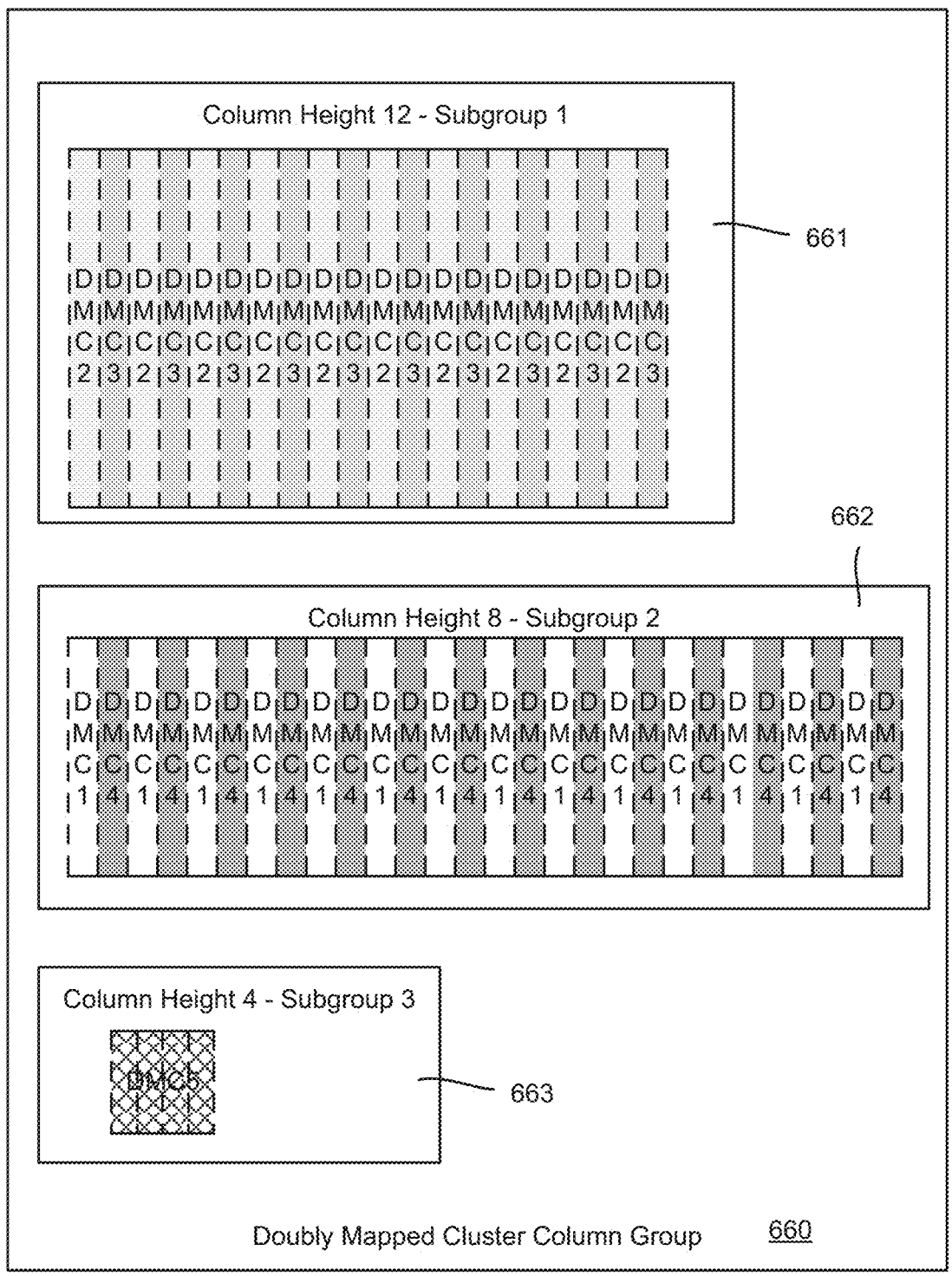
FIG. 6 is an example block diagram representation of subgroups of columns of mapped clusters based on height within a column group, in accordance with various aspects and implementations of the subject disclosure.

Once the logical columns are obtained, as shown in FIG. 5, the logical columns are grouped together into a group 660 (FIG. 6). Note that these columns can be represented as mapped node identifiers in memory, for example, and associated with height information corresponding to their respective number of disks. Indeed, FIG. 6 shows the logical columns grouped into logical subgroups 661-663 by height, where height is number of disks times number of extents per disk, which can be accomplished by height-information based sorting, for example. In actuality subgroups are not needed, but are shown herein for purposes of explanation; (notwithstanding, if used, subgroup membership can be used as the height information, e.g., a column in a first subgroup has greater height than a column in a next subgroup and so on). Note that for purposes of illustration, the columns of two different doubly mapped clusters in a subgroup (DMC2 and DMC3 in subgroup 661 and DMC1 and DMC4 in subgroup 662) are shown as alternating, although as is understood the subgroups need not alternate in this way.

Figure 7:
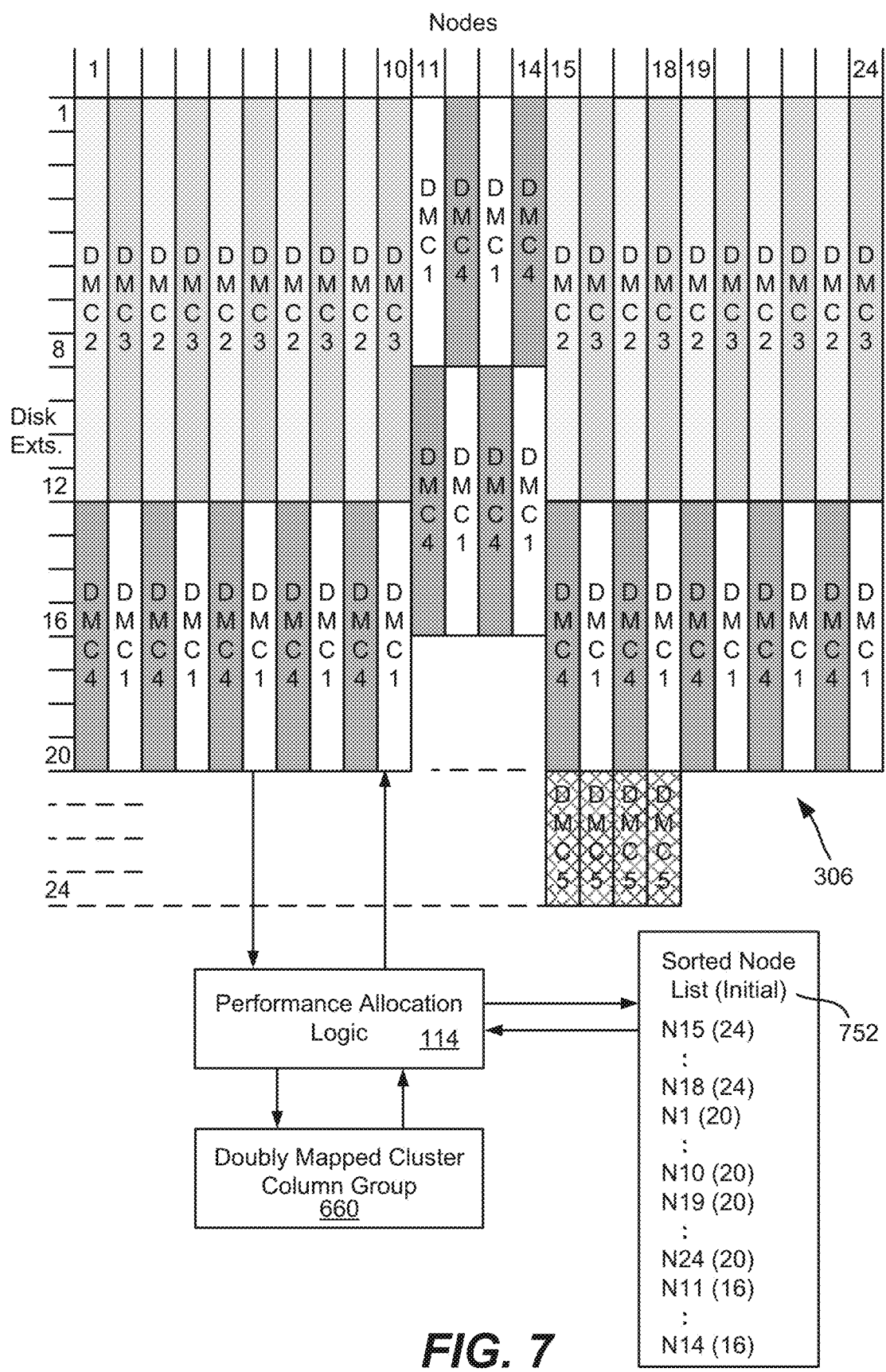
FIG. 7 is an example block diagram representation of columns of mapped clusters being positioned in a logical profile that represents a real cluster, in accordance with various aspects and implementations of the subject disclosure FIGS. 8 and 9 comprise a flow diagram showing example operations for positioning mapped clusters in a logical profile that represents a real cluster, to provide for high performance, in accordance with various aspects and implementations of the subject disclosure.

As represented in FIG. 7, once the group 660 of logical columns are obtained and associated with height information, the performance allocation logic 114 then logically places (positions) the logical columns into a space in the logical profile 306. To this end, nodes are selected based on their number of free disk extents.

In one or more implementations, the nodes and their respective number of free extents are maintained in a node group data structure (list). For example, the list 752 in FIG. 7, shown in its initial state, with the nodes with the greatest number of free extents (24) listed first, then with the next greatest number (20) listed next, and the next greatest number (16) listed last. When the list is accessed to position a column in a node's extent space, some free extents are used; the list is then resorted based on unused extents that remain free/available for use.

Note however that the use of free extents is only one convenient way to select spaces for logically positioning the columns, and other ways are possible. For example, some pre-processing can be done to determine that columns of a certain size map conveniently to certain nodes, and these possibly may be mapped first.

Note further that as used herein, in one orientation, nodes are horizontally arranged and disk extents are vertically arranged, whereby a column of horizontal width one representing a single mapped node has a vertical height corresponding to a number of disk extents. As can be readily appreciated, it is basically identical to have another orientation that is rotated ninety degrees so as to represent nodes as vertically arranged and disk extents as horizontally arranged. Thus the terms "width" and "height" along with "vertical" and "horizontal" and "column" as used herein are understood to be relative to an orientation, e.g., the orientation exemplified in the figures, which can be rotated without changing the general relative meanings of these terms.

Figure 8:
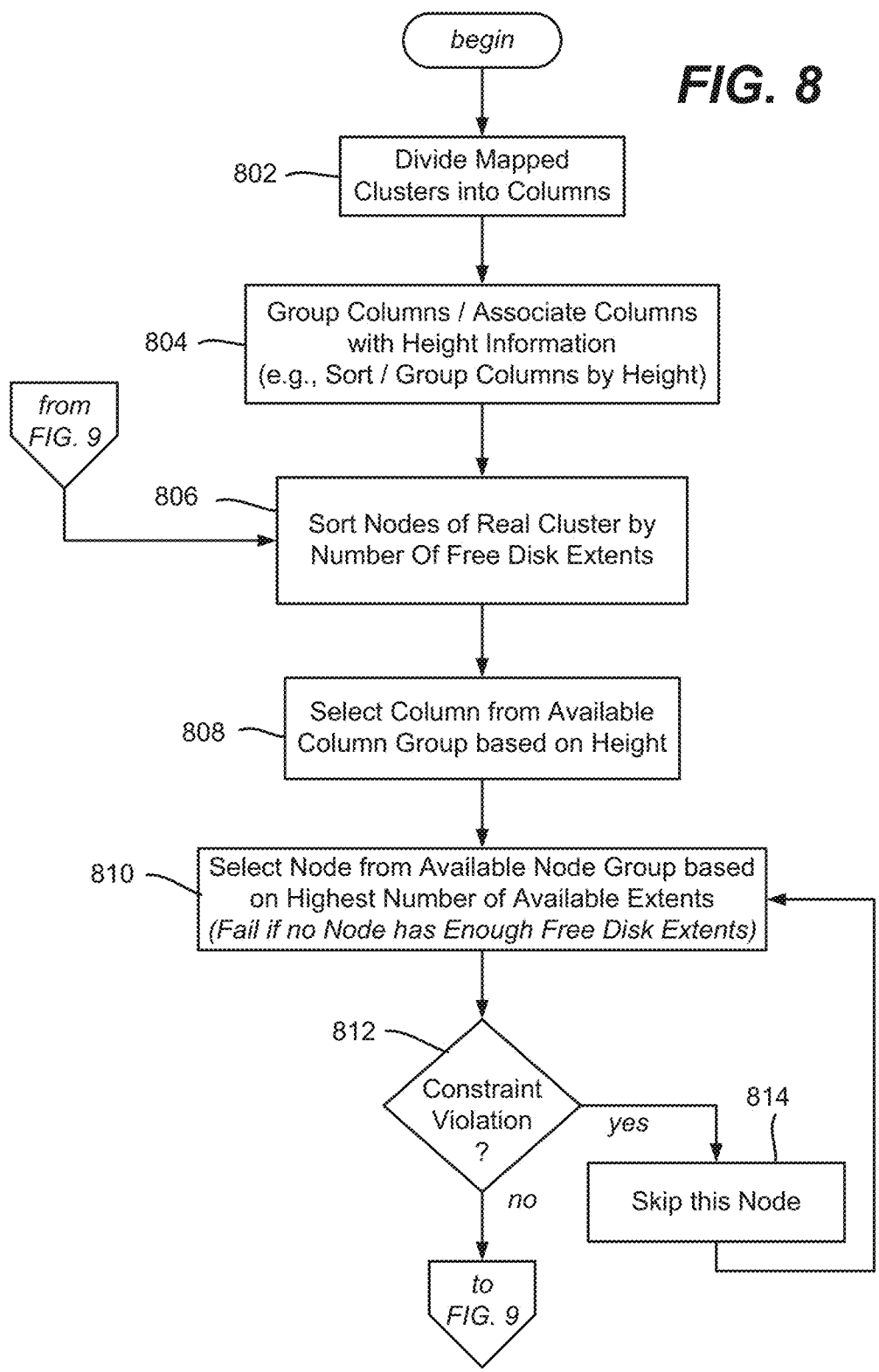
Figure 9:
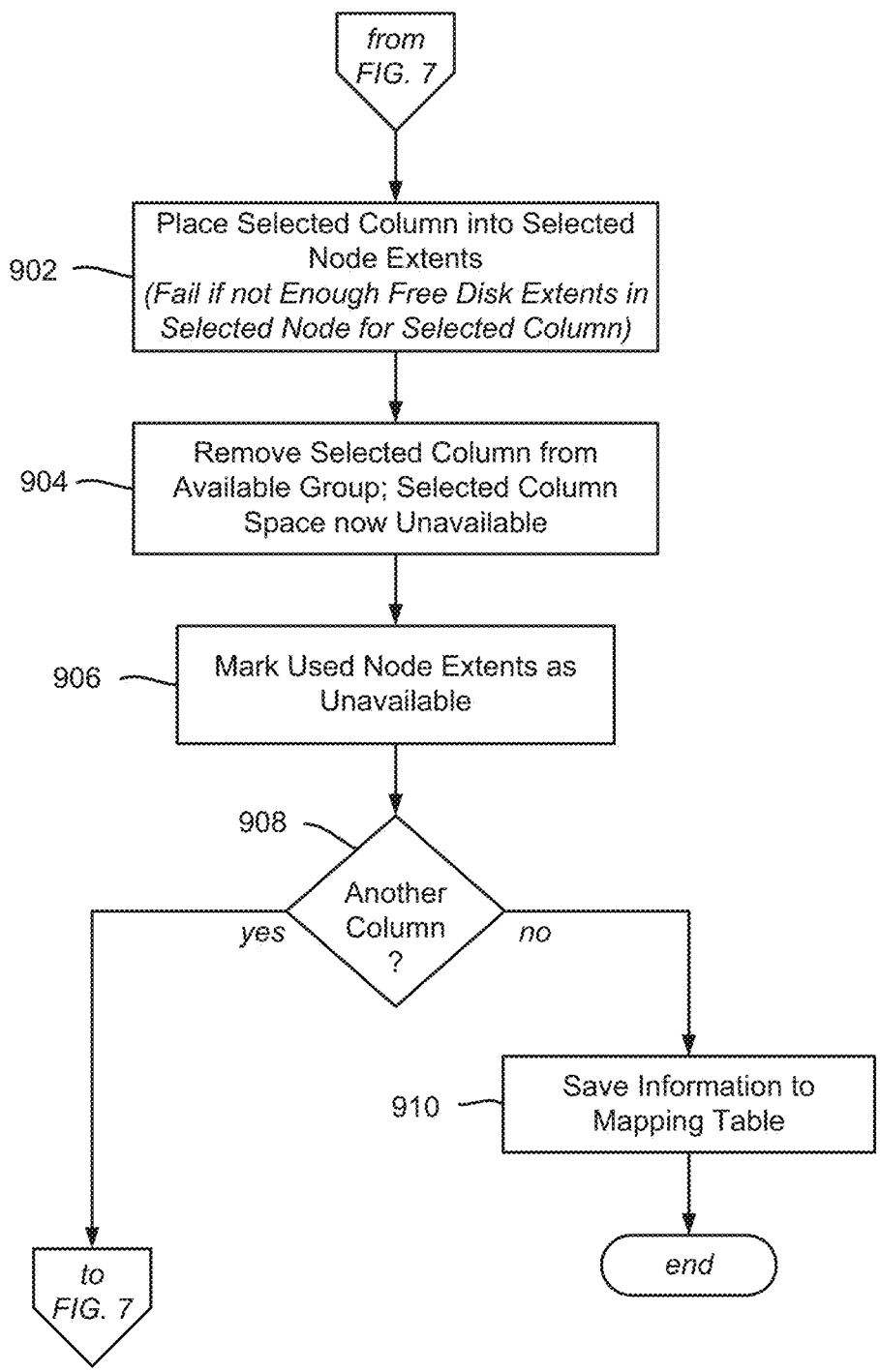

FIGS. 8 and 9 show example operations that can be performed by the performance allocation logic 114, beginning at operation 802 which represents dividing the mapped clusters into the columns as described herein. Operation 804 represents grouping/associating the columns (each column corresponding to a mapped node) with height information, which can include sorting the columns by height, e.g., from greatest height to least height.

Operation 806 represents sorting the list 752 of nodes based on their respective numbers of free extents. Thus, after sorting, the first node has the largest number of free extents. As shown in FIG. 7, if two nodes have the same number of free extents, e.g., 24 free extents for node 15 and node 16, then the node order can be used as a secondary level sort if desired, although this is likely not significant.

Operation 808 represents selecting the column from the group of available columns to place, which in this example is based on greatest height (e.g., initially from the logical subgroup 661, FIG. 6 of mapped columns for DMC2 or DMC3 of height twelve) of those remaining available for placement.

Operation 808 represents selecting a node, corresponding to a column space in the real RAIN profile, based on the free extents of the node, greatest number remaining first. For example, if going by node order, the first column space selected corresponds to the node 15 since this node has 24 free extents. Note that the allocation mapping process fails if no node has enough free disk extents for the selected column to be placed; for purposes of this example such a failure does not occur.

Operation 812 checks for whether the selected node, if the column is placed therein, will violate the constraint that two disks managed by one real node are not to go to different mapped nodes of one mapped cluster. This can be rephrased using column-based terminology as no two columns that belong to one mapped cluster can be mapped to one real node. If the constraint is violated, operation 812 skips this node (note that the skipped node will be selected and evaluated again in a subsequent iteration).

In other words, operation 812 checks that the mapped disks, which form the column, can have a valid layout using the free disk extents of the real node. If not (for instance, the selected (e.g., first listed) node has already allocated its disk extents for other mapped node of the same doubly mapped cluster), the first node is skipped, and the process proceeds with the second listed node being selected (and so on as needed) from the list of real nodes. The process fails if no node with enough free disk extents and that meets the constraint is available.

When a node that does not violate the constraint is selected, the example operations continue in FIG. 9. Operation 902 of FIG. 9 represents positioning (logically placing) the selected column in the selected node's free extent space; for example, top-down placement provides for suitable placement.

Operation 904 removes the selected column from the group of those available, which can be by deletion of the column identifier from working memory, flagging of the column identifier in working memory as having been placed, and so on. Operation 906 similarly makes the selected extents unavailable for further placement of a column. Note that while looping back to operation 806 of FIG. 8, this results in a resorting of the node list 752, e.g., once the column of height twelve for DMC2 is placed in the node 15's free extent space, the node 15 now has only twelve free disk extents remaining, and thus is moved down in the list 752.

As can be seen by following the example logic/operations of FIGS. 8 and 9 in conjunction with the example in FIG. 7, the remaining DMC1 and DMC4 columns are placed in column spaces selected by the nodes' free extents. As can be seen, the remaining extents (column spaces) are selected for the columns of doubly mapped cluster DMC5.

Operation 908 continues the process until no columns remain. When no columns remain, the placement information is placed into the mapping table/the mapping table is finalized. Thus, in this example, when the last DMC5 column is placed in the logical profile (e.g., an array in memory), operation 908 branches to operation 910 which saves the information for the logical profile into an appropriate format for the mapping table. Resource allocation is successful when the columns of doubly mapped clusters are placed within the enclosing profile of the real RAIN. At this time, the doubly mapped clusters can be used for data I/O, with high performance resulting from the strategic allocation and mapping as described herein.

Figure 10:
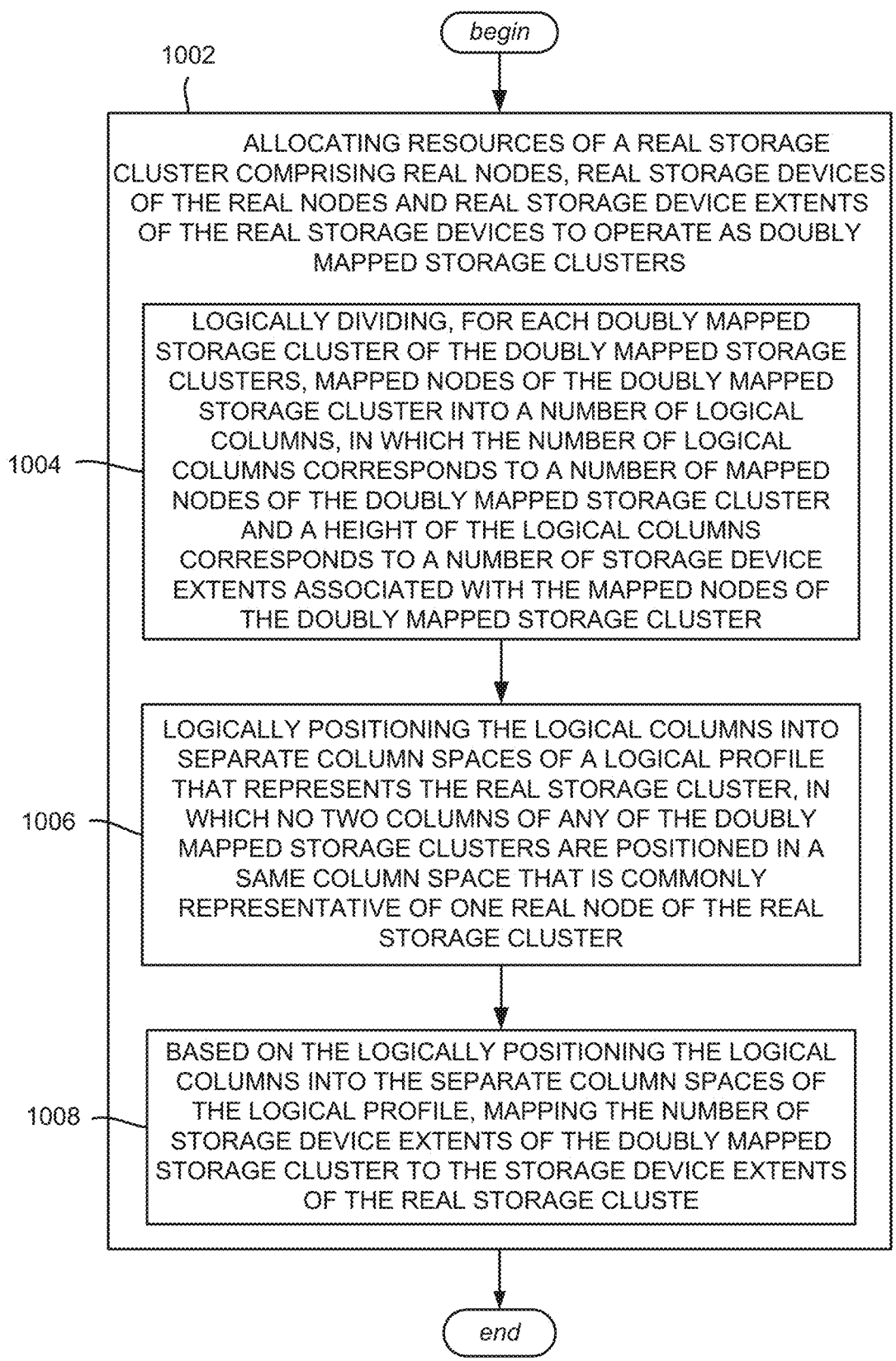
FIG. 10 is a flow diagram showing example operations for allocating storage resources of a real cluster using logical columns of mapped nodes and logical column spaces representing storage device extents, in accordance with various aspects and implementations of the subject disclosure.

One or more aspects are represented in FIG. 10, such as of a system comprising a processor, and a memory that stores executable instructions that, when executed by the processor, facilitate performance of operations. Operation 1002 represents allocating resources of a real storage cluster comprising real nodes, real storage devices of the real nodes and real storage device extents of the real storage devices to operate as doubly mapped storage clusters. The allocating comprises operations 1004, 1006 and 1008. Operation 1004 represents logically dividing, for each doubly mapped storage cluster of the doubly mapped storage clusters, mapped nodes of the doubly mapped storage cluster into a number of logical columns, in which the number of logical columns corresponds to a number of mapped nodes of the doubly mapped storage cluster and a height of the logical columns corresponds to a number of storage device extents associated with the mapped nodes of the doubly mapped storage cluster. Operation 1006 represents logically positioning the logical columns into separate column spaces of a logical profile that represents the real storage cluster, in which no two columns of any of the doubly mapped storage clusters are positioned in a same column space that is commonly representative of one real node of the real storage cluster. Operation 1008 represents, based on the logically positioning the logical columns into the separate column spaces of the logical profile, mapping the number of storage device extents of the doubly mapped storage cluster to the storage device extents of the real storage cluster.

The logical profile can comprise a logical representation of a heterogeneous real cluster in which at least two real nodes have a different number of real storage device extents. The logical profile can comprise a logical rectangle in which the real nodes each have a same number of real storage device extents.

Logically dividing, for the doubly mapped storage cluster, can comprise dividing the mapped nodes of the doubly mapped storage cluster into one column of the number of logical columns per each mapped node of the mapped nodes of the doubly mapped storage cluster.

Logically positioning the logical columns into the separate column spaces can comprise sorting the logical columns based on the height of each column of the number of logical columns into a height-ordered logical column group, and selecting the logical columns for the positioning based on ordering in the height-ordered logical column group.

Logically positioning the logical columns into the separate column spaces can comprise selecting the logical columns for the positioning from greatest-height columns to lowest-height columns.

Logically positioning the logical columns into the separate column spaces can comprise selecting a column space corresponding to a real node having a greatest number of free disk extents.

Further operations can comprise, facilitating a data operation that references a mapped storage device extent of the respective doubly mapped storage clusters to occur in a storage device extent of the real storage device extents of the real storage cluster based on the mapping the respective numbers of storage device extents of the respective doubly mapped storage clusters to the real storage device extents of the real storage cluster.

Figure 11:
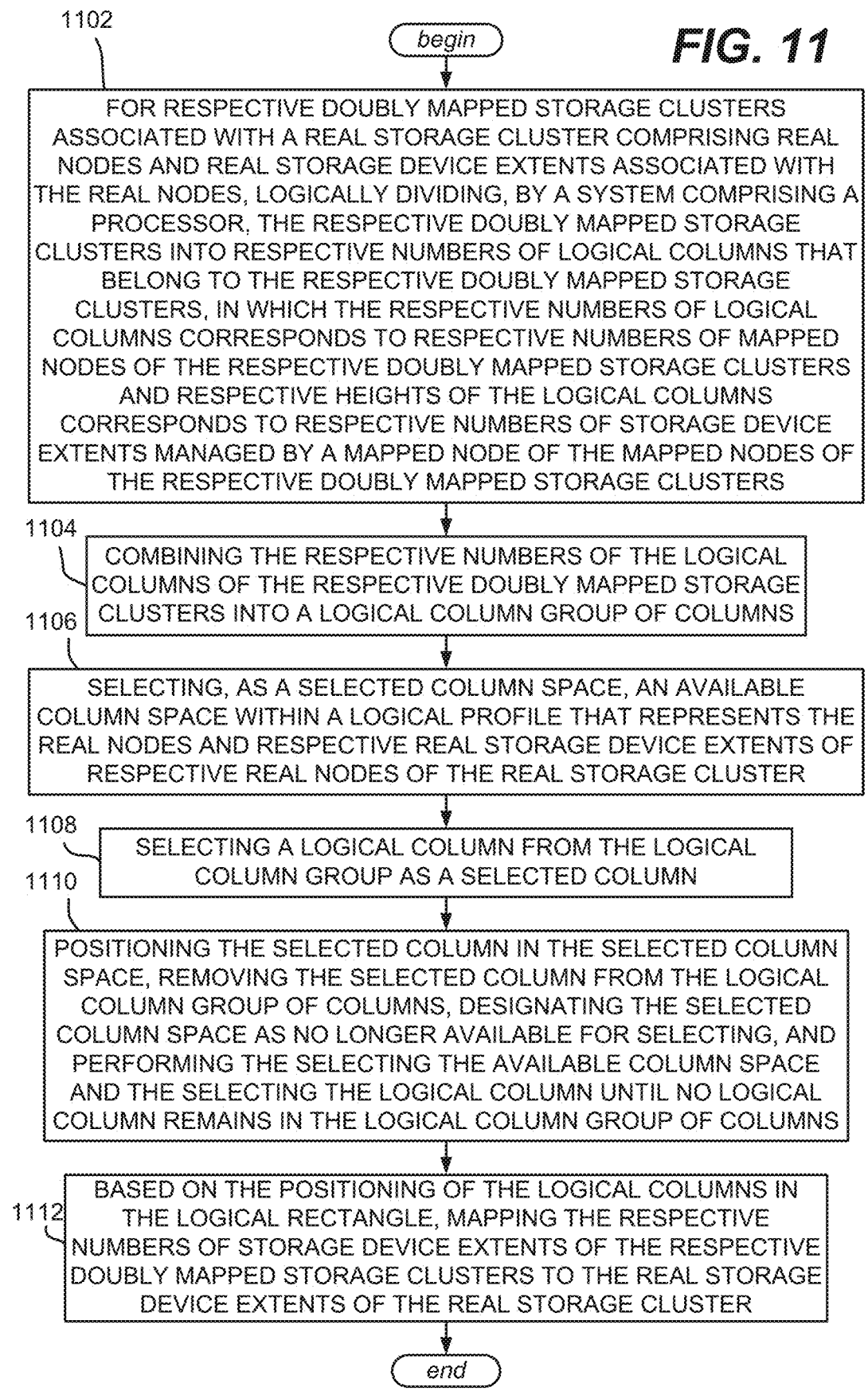
FIG. 11 is a flow diagram showing example operations for positioning columns of mapped nodes in a logical profile that represents a real cluster, based on free storage device extents in accordance with various aspects and implementations of the subject disclosure.

One or more aspects are represented in FIG. 11, such as performed by a method. Example operations can comprise operation 1102, which represents, for respective doubly mapped storage clusters associated with a real storage cluster comprising real nodes and real storage device extents associated with the real nodes, logically dividing, by a system comprising a processor, the respective doubly mapped storage clusters into respective numbers of logical columns that belong to the respective doubly mapped storage clusters, in which the respective numbers of logical columns corresponds to respective numbers of mapped nodes of the respective doubly mapped storage clusters and respective heights of the logical columns corresponds to respective numbers of storage device extents managed by a mapped node of the mapped nodes of the respective doubly mapped storage clusters. Operation 1104 represents combining the respective numbers of the logical columns of the respective doubly mapped storage clusters into a logical column group of columns. Operation 1106 represents selecting, as a selected column space, an available column space within a logical profile that represents the real nodes and respective real storage device extents of respective real nodes of the real storage cluster. Operation 1108 represents selecting a logical column from the logical column group as a selected column. Operation 1110 represents positioning the selected column in the selected column space, removing the selected column from the logical column group of columns, designating the selected column space as no longer available for selecting, and performing the selecting the available column space and the selecting the logical column until no logical column remains in the logical column group of columns. Operation 1112 represents based on the positioning of the logical columns in the logical rectangle, mapping the respective numbers of storage device extents of the respective doubly mapped storage clusters to the real storage device extents of the real storage cluster.

Combining the respective numbers of the logical columns of the respective doubly mapped storage clusters into the logical column group of columns can comprise sorting the respective numbers of the logical columns based on height into the logical column group of columns.

The respective numbers of the logical columns of the group can be associated with height information, and selecting the logical column from the logical column group of columns as the selected column can comprise selecting, as the selected column, the logical column based on the height information.

The mapped nodes can be horizontally represented in the logical profile and the respective numbers of the logical columns can be vertically represented within the logical profile, and selecting the logical column from the logical column group of columns as the selected column can comprise skipping over an available logical column in the logical column group of columns in response to determining that the available logical column belongs to a first doubly mapped storage cluster and determining that the selected column space is vertically aligned with a previously selected column space in which a previously selected column that belongs to the first doubly mapped storage cluster is positioned.

Aspects can comprise facilitating a data operation that references a mapped storage device extent of the respective doubly mapped storage clusters to occur in a storage device extent of the real storage device extents of the real storage cluster based on the mapping the respective numbers of storage device extents of the respective doubly mapped storage clusters to the real storage device extents of the real storage cluster.

Selecting, as the selected column space, the available column space can comprise determining a node with a greatest number of free disk extents corresponding to the selected column space. Aspects can comprise designating the available disk extents as no longer free after positioning the selected column in the selected column space.

The columns of the logical column group can be associated with height information, selecting the logical column from the logical column group as the selected column can comprise selecting, as the selected column, the logical column having a greatest height based on the height information, and selecting, as the selected column space, the available column space within the logical profile can comprise determining a node with a greatest number of free disk extents corresponding to the selected column space.

Figure 12:
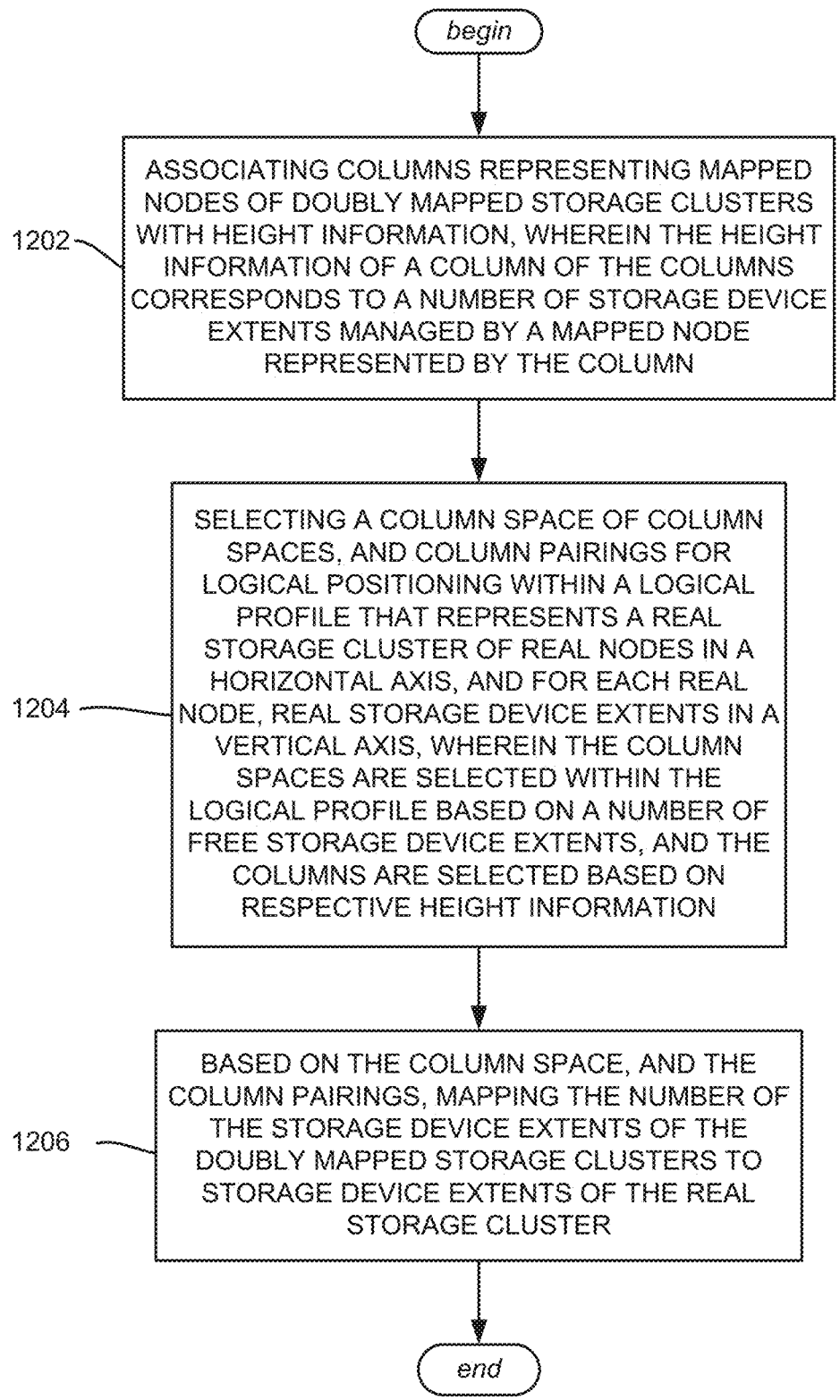
FIG. 12 is a flow diagram showing example operations for selecting mapped columns based on height for positioning the columns based on free storage device extents in a logical profile that represents a real cluster, in accordance with various aspects and implementations of the subject disclosure.

One or more aspects are represented as example operations in FIG. 12, and for example, can correspond a machine-readable storage medium, comprising executable instructions that, when executed by a processor, facilitate performance of the operations. Operation 1202 represents associating columns representing mapped nodes of doubly mapped storage clusters with height information, wherein the height information of a column of the columns corresponds to a number of storage device extents managed by a mapped node represented by the column. Operation 1204 represents selecting a column space of column spaces, and column pairings for logical positioning within a logical profile that represents a real storage cluster of real nodes in a horizontal axis, and for each real node, real storage device extents in a vertical axis, wherein the column spaces are selected within the logical profile based on a number of free storage device extents, and the columns are selected based on respective height information. Operation 1206 represents, based on the column space, and the column pairings, mapping the number of the storage device extents of the doubly mapped storage clusters to storage device extents of the real storage cluster.

Selecting the column space, and the column pairings further can comprise evaluating whether a first candidate column for the column space, and a column pairing of the column pairings violates a constraint that avoids having two columns representing a common doubly mapped storage cluster mapped to a real node of the real storage cluster, and in response to the constraint being determined not to have been violated by the column space and the column pairing, forming a first candidate column pairing, and using the first candidate column for the column space, and the given column pairing, and in response to the constraint being determined to have been violated by the column space and the column pairing, forming the first candidate column pairing, locating a second candidate column that does not violate the constraint, and using the second candidate column for the column space, and the column pairing.

Selecting the column space, and the column pairings can comprise locating, for a selected column, the column space that is not previously paired with a column.

Selecting the column space, and the column pairings can comprise selecting a first column that is not previously selected based on first height information associated with the first column that indicates the first column has a greater height than a second column based on second height information associated with the second column.

As can be seen, the technology described herein provides for packing columns representing mapped nodes into a logical profile with dimensions of a real cluster, which corresponds to mapping mapped clusters to real cluster resources. Instead of complex packing analysis, packing is relatively straightforward because the mapped clusters are divided into columns. With columns, resource allocation corresponds to placement in a logical profile being performed for N' columns. Note that packing the columns is straightforward, because the columns are almost independent, except for the constraint that no two columns that belong to one mapped cluster can be mapped to one real node.

Figure 13:
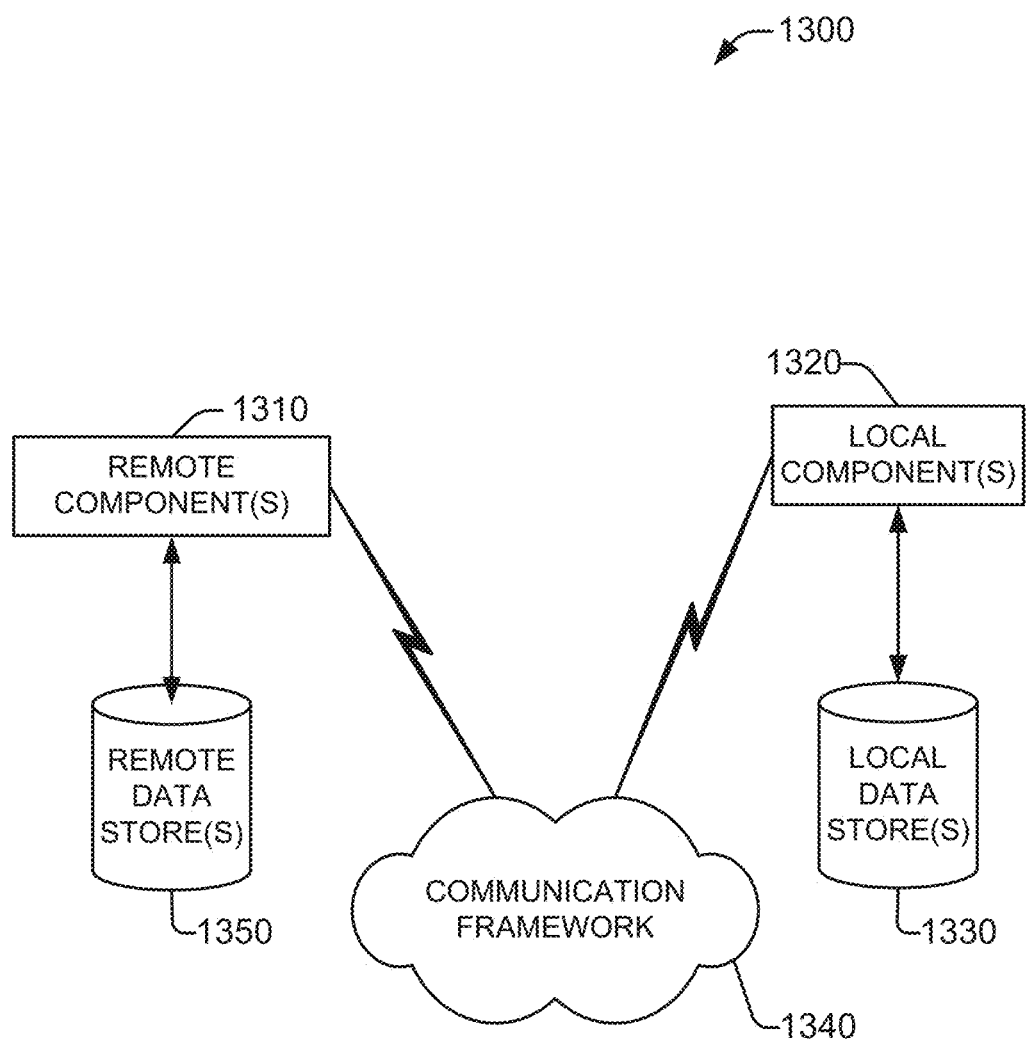
FIG. 13 depicts an example schematic block diagram of a computing environment with which the disclosed subject matter can interact.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
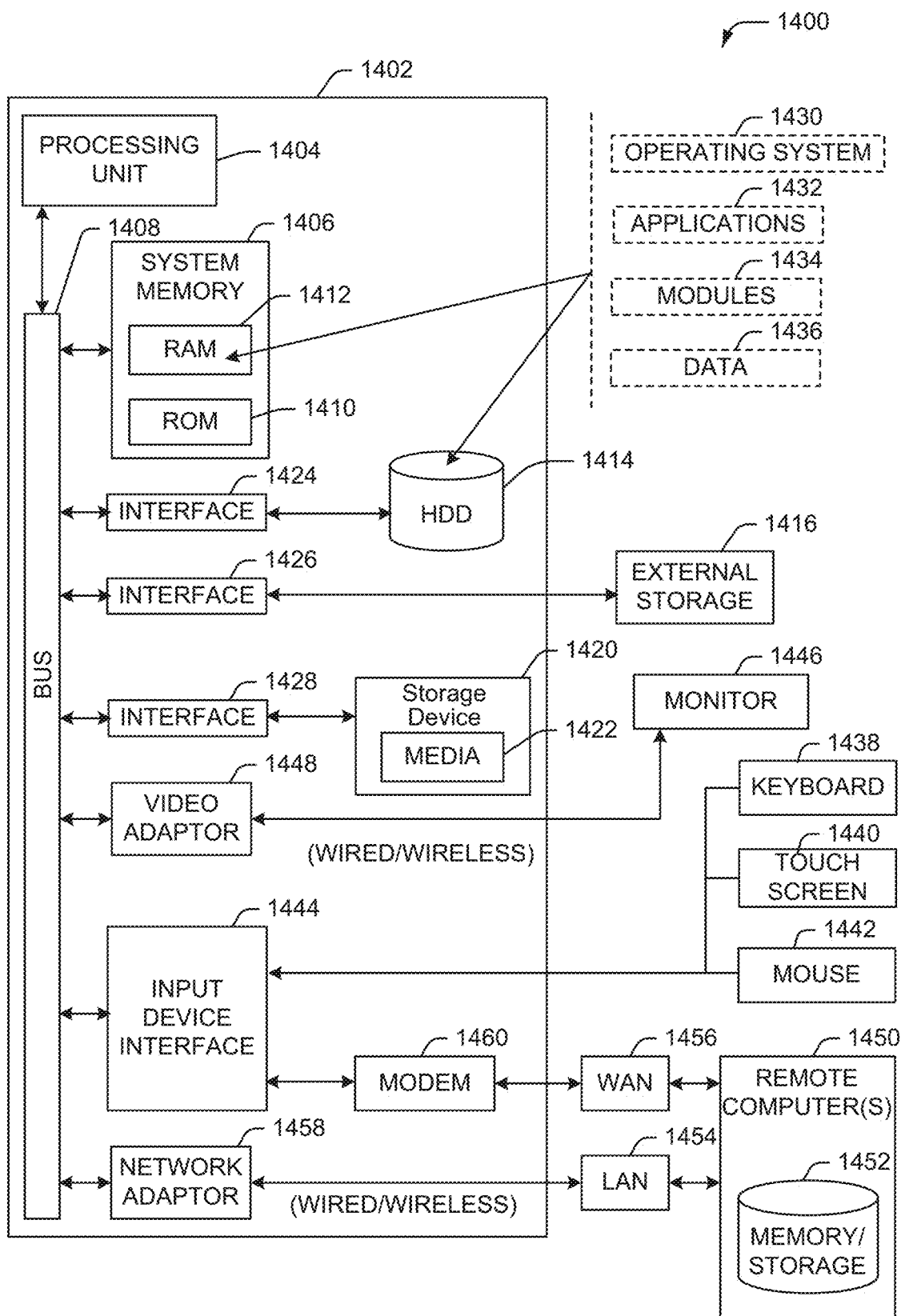
FIG. 14 illustrates an example block diagram of a computing system operable to execute the disclosed systems and methods in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
allocating resources of a real storage cluster comprising real nodes, real storage devices of the real nodes and real storage device extents of the real storage devices to operate as doubly mapped storage clusters, the allocating comprising:
logically dividing, for each doubly mapped storage cluster of the doubly mapped storage clusters, mapped nodes of the doubly mapped storage cluster into a number of logical columns, in which the number of logical columns corresponds to a number of mapped nodes of the doubly mapped storage cluster and a height of the logical columns corresponds to a number of storage device extents associated with the mapped nodes of the doubly mapped storage cluster;
logically positioning the logical columns into separate column spaces of a logical profile that represents the real storage cluster, in which no two columns of any of the doubly mapped storage clusters are positioned in a same column space that is commonly representative of one real node of the real storage cluster; and
based on the logically positioning the logical columns into the separate column spaces of the logical profile, mapping the number of storage device extents of the doubly mapped storage cluster to the storage device extents of the real storage cluster.

2. The system of claim 1, wherein the logical profile comprises a logical representation of a heterogeneous real cluster in which at least two real nodes have a different number of real storage device extents.

3. The system of claim 1, wherein the logical profile comprises a logical rectangle in which the real nodes each have a same number of real storage device extents.

4. The system of claim 1, wherein the logically dividing, for the doubly mapped storage cluster, comprises dividing the mapped nodes of the doubly mapped storage cluster into one column of the number of logical columns per each mapped node of the mapped nodes of the doubly mapped storage cluster.

5. The system of claim 1, wherein the logically positioning the logical columns into the separate column spaces comprises sorting the logical columns based on the height of each column of the number of logical columns into a height-ordered logical column group, and selecting the logical columns for the positioning based on ordering in the height-ordered logical column group.

6. The system of claim 1, wherein the logically positioning the logical columns into the separate column spaces comprises selecting the logical columns for the positioning from greatest-height columns to lowest-height columns.

7. The system of claim 1, wherein the logically positioning the logical columns into the separate column spaces comprises selecting a column space corresponding to a real node having a greatest number of free disk extents.

8. The system of claim 1, wherein the operations further comprise facilitating a data operation that references a mapped storage device extent of the respective doubly mapped storage clusters to occur in a storage device extent of the real storage device extents of the real storage cluster based on the mapping the respective numbers of storage device extents of the respective doubly mapped storage clusters to the real storage device extents of the real storage cluster.

9. A method comprising:
for respective doubly mapped storage clusters associated with a real storage cluster comprising real nodes and real storage device extents associated with the real nodes, logically dividing, by a system comprising a processor, the respective doubly mapped storage clusters into respective numbers of logical columns that belong to the respective doubly mapped storage clusters, in which the respective numbers of logical columns corresponds to respective numbers of mapped nodes of the respective doubly mapped storage clusters and respective heights of the logical columns corresponds to respective numbers of storage device extents managed by a mapped node of the mapped nodes of the respective doubly mapped storage clusters;
combining the respective numbers of the logical columns of the respective doubly mapped storage clusters into a logical column group of columns;
selecting, as a selected column space, an available column space within a logical profile that represents the real nodes and respective real storage device extents of respective real nodes of the real storage cluster;
selecting a logical column from the logical column group as a selected column;

positioning the selected column in the selected column space, removing the selected column from the logical column group of columns, designating the selected column space as no longer available for selecting, and performing the selecting the available column space and the selecting the logical column until no logical column remains in the logical column group of columns; and based on the positioning of the logical columns in the logical rectangle, mapping the respective numbers of storage device extents of the respective doubly mapped storage clusters to the real storage device extents of the real storage cluster.

10. The method of claim 9, wherein the combining the respective numbers of the logical columns of the respective doubly mapped storage clusters into the logical column group of columns comprises sorting the respective numbers of the logical columns based on height into the logical column group of columns.

11. The method of claim 9, wherein the respective numbers of the logical columns of the group are associated with height information, and wherein the selecting the logical column from the logical column group of columns as the selected column comprises selecting, as the selected column, the logical column based on the height information.

12. The method of claim 9, wherein the mapped nodes are horizontally represented in the logical profile and the respective numbers of the logical columns are vertically represented within the logical profile, and wherein the selecting the logical column from the logical column group of columns as the selected column comprises skipping over an available logical column in the logical column group of columns in response to determining that the available logical column belongs to a first doubly mapped storage cluster and determining that the selected column space is vertically aligned with a previously selected column space in which a previously selected column that belongs to the first doubly mapped storage cluster is positioned.

13. The method of claim 9, further comprising, facilitating a data operation that references a mapped storage device extent of the respective doubly mapped storage clusters to occur in a storage device extent of the real storage device extents of the real storage cluster based on the mapping the respective numbers of storage device extents of the respective doubly mapped storage clusters to the real storage device extents of the real storage cluster.

14. The method of claim 9, wherein the selecting, as the selected column space, the available column space comprises determining a node with a greatest number of free disk extents corresponding to the selected column space.

15. The method of claim 14, further comprising, designating the available disk extents as no longer free after positioning the selected column in the selected column space.

16. The method of claim 9, wherein the columns of the logical column group are associated with height information, wherein the selecting the logical column from the logical column group as the selected column comprises selecting, as the selected column, the logical column having a greatest height based on the height information, and wherein the selecting, as the selected column space, the available column space within the logical profile comprises determining a node with a greatest number of free disk extents corresponding to the selected column space.

17. A non-transitory machine-readable medium, comprising executable instructions that, when executed by a processor, facilitate performance of operations, the operations comprising:

associating columns representing mapped nodes of doubly mapped storage clusters with height information, wherein the height information of a column of the columns corresponds to a number of storage device extents managed by a mapped node represented by the column;

selecting a column space of column spaces, and column pairings for logical positioning within a logical profile that represents a real storage cluster of real nodes in a horizontal axis, and for each real node, real storage device extents in a vertical axis, wherein the column spaces are selected within the logical profile based on a number of free storage device extents, and the columns are selected based on respective height information; and based on the column space, and the column pairings, mapping the number of the storage device extents of the doubly mapped storage clusters to storage device extents of the real storage cluster.

18. The non-transitory machine-readable medium of claim 17, wherein the selecting the column space, and the column pairings further comprises evaluating whether a first candidate column for the column space, and a column pairing of the column pairings violates a constraint that avoids having two columns representing a common doubly mapped storage cluster mapped to a real node of the real storage cluster, and in response to the constraint being determined not to have been violated by the column space and the column pairing, forming a first candidate column pairing, and using the first candidate column for the column space, and the given column pairing, and in response to the constraint being determined to have been violated by the column space and the column pairing, forming the first candidate column pairing, locating a second candidate column that does not violate the constraint, and using the second candidate column for the column space, and the column pairing.

19. The non-transitory machine-readable medium of claim 17, wherein the selecting the column space, and the column pairings comprises locating, for a selected column, the column space that is not previously paired with a column.

20. The non-transitory machine-readable medium of claim 17, wherein the selecting the column space, and the column pairings comprises selecting a first column that is not previously selected based on first height information associated with the first column that indicates the first column has a greater height than a second column based on second height information associated with the second column.

* * * * *